United States Patent [19]

Brown

[11] 4,152,906

[45] May 8, 1979

[54] VARIABLE CONTROLLED SPRING PRESSURE LOCK

[75] Inventor: William L. Brown, Chicago, Ill.

[73] Assignee: Borg-Warner Corporation, Chicago, Ill.

[21] Appl. No.: 796,288

[22] Filed: May 12, 1977

[51] Int. Cl.² .............................................. F16D 3/66
[52] U.S. Cl. .................................. 64/15 B; 85/50 R; 267/161; 192/106.2
[58] Field of Search ............ 192/106.2, 109 A, 109 B; 64/30 C, 30 R, 15 B; 285/340; 85/50 R, 37; 151/14 DW, 19 R, 38; 267/161, 162

[56] References Cited

U.S. PATENT DOCUMENTS

| | | | |
|---|---|---|---|
| 1,472,405 | 10/1923 | Amberton | 85/50 R |
| 2,183,130 | 12/1939 | Binder | 192/106.2 |
| 2,525,379 | 10/1950 | Smilansky | 64/30 R |
| 3,030,996 | 4/1962 | Doerr | 151/19 R |
| 3,091,949 | 6/1963 | Sink | 192/106.2 X |
| 3,425,528 | 2/1969 | Perruca | 64/30 R |
| 3,915,029 | 10/1975 | Shimada | 64/30 C |

*Primary Examiner*—Benjamin W. Wyche
*Attorney, Agent, or Firm*—James A. Geppert

[57] ABSTRACT

A retainer to hold a Belleville or diaphragm spring onto a rivet or similar securing member and provide a controlled spring pressure against an assembly retained by the securing member. The retainer includes a housing having a recess within which the diaphragm spring is received and a cap having a portion projecting into the recess to engage the spring and exert force thereon to reduce the height of the spring and control the spring pressure.

9 Claims, 5 Drawing Figures

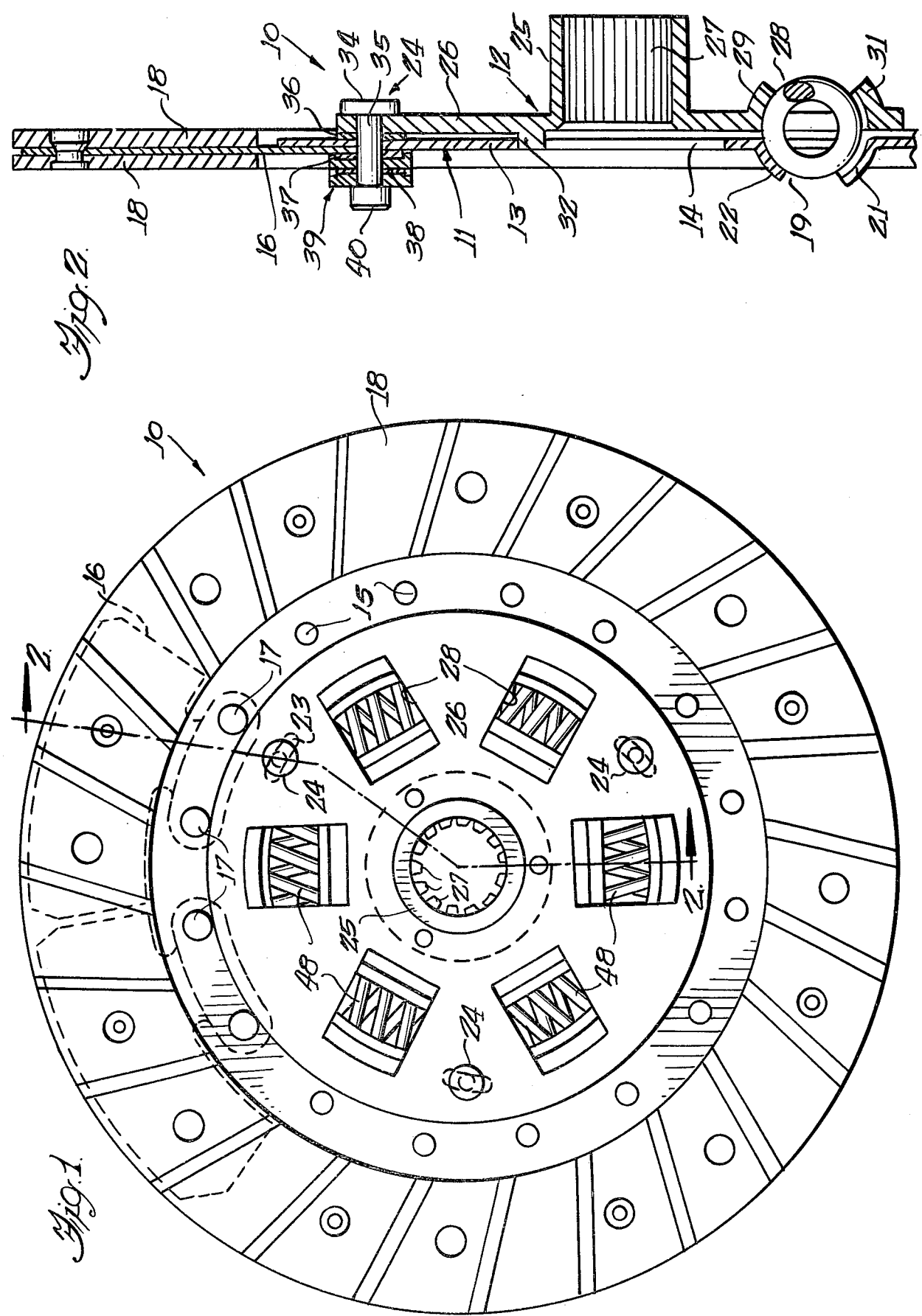

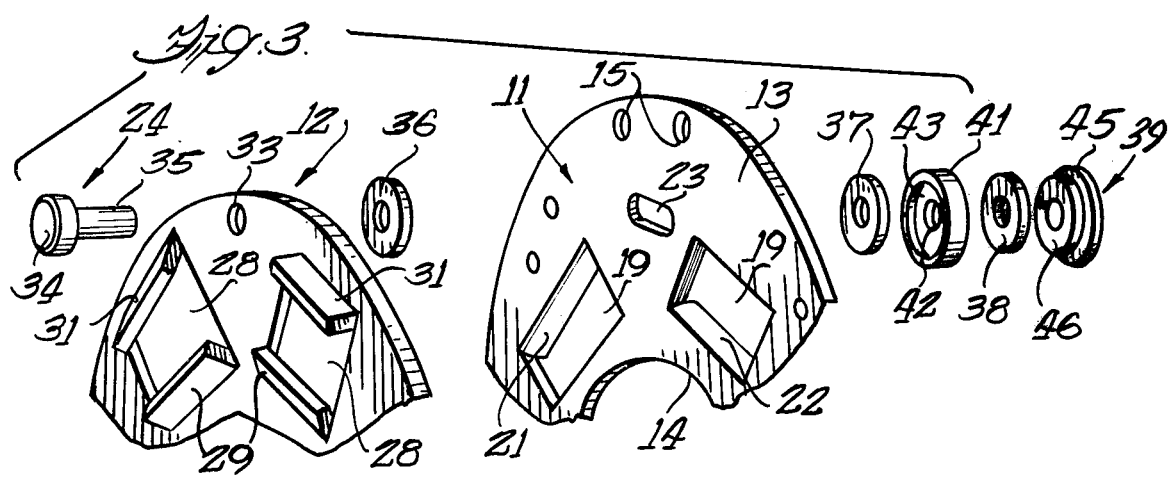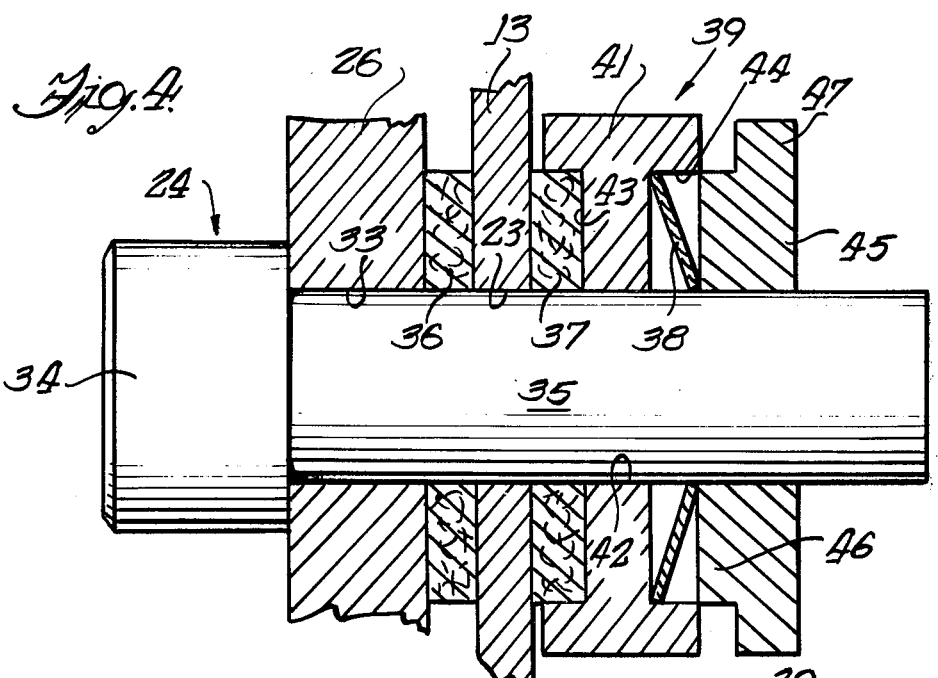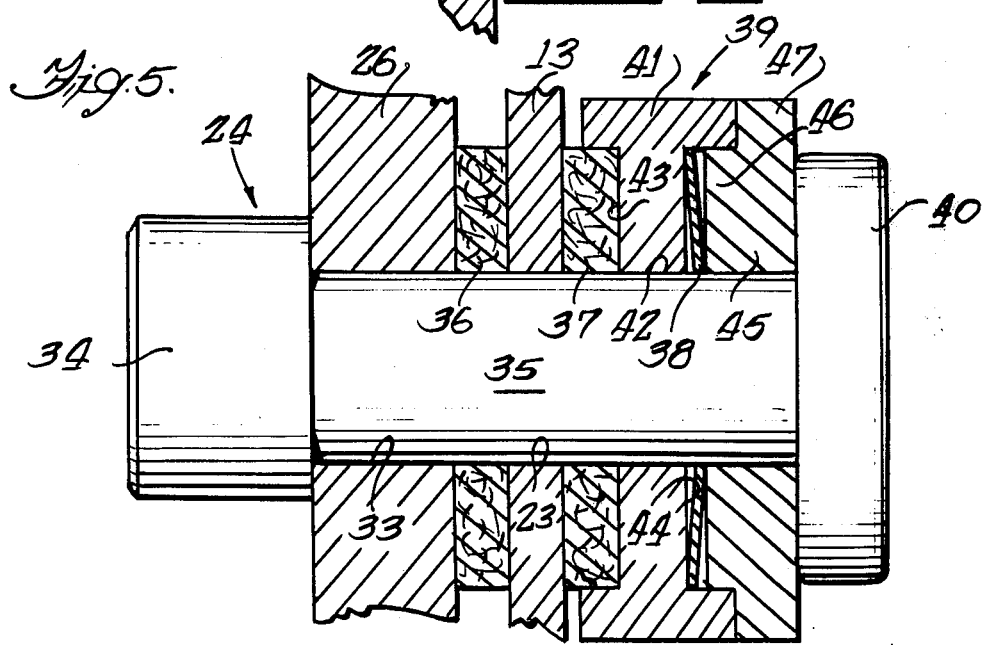

VARIABLE CONTROLLED SPRING PRESSURE LOCK

BACKGROUND AND SUMMARY OF THE INVENTION

Where a diaphragm spring is to be positioned onto a rivet or similar securing member, such as shown in U.S. Pat. No. 2,042,570, there is a problem of controlling the height of the spring during the riveting operation to provide the requisite spring pressure necessary to develop friction for proper operation of the vibration damper. The present invention obviates this problem by providing a retainer for the diaphragm where the spring pressure can be controlled.

The present invention comprehends the provision of a retainer for a diaphragm spring to be utilized with a rivet or similar securing member wherein the diaphragm spring is enclosed in the retainer and the spring pressure exerted thereby can be controlled by the internal dimensions of the retainer. The spring pressure is exerted from the headed rivet against the retainer to develop friction from one or more friction washers also positioned on the rivet and engaging the remaining portions of the assembly secured by the rivet.

The present invention also comprehends the provision of a retainer for a diaphragm or conical spring wherein the retainer includes a housing and a cap. The housing has a recess to receive the diaphragm spring, and the cap has a reduced diameter portion adapted to project into the recess and limit the interior height of the recess to less than the height of the unstressed spring. Both the housing and cap are received on a rivet so that the heading operation for the rivet retains the housing and cap in their assembled condition.

The present invention further comprehends the provision of a retainer for a diaphragm spring which allows the spring to expand and compensate for wear in the assembly secured by the rivet. As wear occurs in the assembly, the diaphragm spring will expand forcing the retainer housing and cap apart to the limit where the spring is longer under stress. As the spring expands, it will provide pressure on the friction devices on the rivet.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view of a two-piece vibration damper assembly utilizing the spring retainer of the present invention.

FIG. 2 is a vertical cross sectional view taken on the irregular line 2—2 of FIG. 1.

FIG. 3 is a partial exploded perspective view of the damper assembly and showing the positioning of the rivet, spring and retainer and the friction means thereon.

FIG. 4 is an enlarged cross sectional view of the diaphragm spring and retainer prior to heading the rivet.

FIG. 5 is an enlarged cross sectional view similar to FIG. 4 but after the rivet is headed.

DESCRIPTION OF THE PREFERRED EMBODIMENT

Referring more particularly to the disclosure in the drawings wherein is shown an illustrative embodiment of the present invention, FIGS. 1 and 2 disclose a two-piece vibration damper assembly 10 similar to that shown in my copending patent application Ser. No. 720,040, filed Sept. 2, 1976. This assembly includes a clutch plate 11 and a hub 12; the clutch plate comprising an annular plate 13 with a central opening 14 and a plurality of openings 15 adjacent the outer periphery for securing spring cushions 16 thereto by rivets 17; the spring cushions supporting annular friction facings 18 by suitable securing means.

The plate 13 also contains a plurality of circumferentially spaced spring pockets 19 defined by outer and inner spring retaining lips 21 and 22, respectively. A plurality of arcuate slots 23 are circumferentially equally spaced in the plate to receive securing means, such as rivets 24, to secure the hub 12 and plate 13 together.

The one-piece clutch hub 12 is stamped from sheet metal to provide a barrel 25 and an integral radially extending flange 26; the barrel projecting from only one side of the flange. The barrel is provided with suitable internal splines 27 for an operative connection to a driven shaft (not shown). Formed in the flange 26 are a plurality of spring pockets 28 defined by inner and outer spring retaining lips 29 and 31, respectively, and a plurality of piloting means or extruded bosses 32 are formed closely adjacent to but projecting from the side of the flange opposite the barrel 25 to be received in the central opening 14 of the plate 13. These bosses cooperate with the periphery of opening 14 to pilot the plate 13 relative to the hub and preserve the concentricity between these two parts.

Adjacent the outer periphery of the flange are positioned openings 33 corresponding in number to and aligned with the arcuate slots 23 in the plate 14. The slots 23 and the openings 33 receive the rivets 24 acting to both hold the assembly together and as stop pins for the vibration damper function where the plate and hub have limited rotation relative to each other. Each rivet 24 is provided with an enlarged head 34 abutting the rear face of the flange 26 and a shank 35; a friction washer 36 is positioned thereon between the plate and flange; and a second friction washer 37 is located at the front fact of the plate. A conical or diaphragm spring 38, such as a Belleville spring, and a spring retainer 39 receiving the spring 38 are located on the free end of the rivet, which is headed as at 40 to retain the parts together.

The spring retainer 39 includes a retainer housing 41 having a central opening 42 receiving the rivet shank, a shallow recess 43 at one end to conformably receive the friction washer 37 and a deeper recess 44 at the opposite end to receive the diaphragm spring 38 therein; the recess 44 being slightly deeper than the height of the unstressed spring. A retainer cap 45 has the same diameter as the housing 41 and is provided with a central projection 46 adapted to be conformably received in the recess 44. The projection 46 is of a height as to engage and compress the diaphragm spring when the cap flange 47 abuts the end of the housing 41.

To assemble the vibration damper, a plurality of compression coil springs 48 are positioned in the aligned spring pockets 19 and 28 of the plate 13 and flange 26, respectively, and the friction washers 36 are aligned with the slots 23 and openings 33 and positioned between the plate and flange; the bosses 32 on the flange 26 projecting into the central opening 14 of the plate 13. The rivets 24 are inserted through the openings 33, washers 36, slots 23, washers 37, housings 41, springs 38 and retainer caps 45 to project therebeyond.

FIG. 4 shows the position of a housing 41, spring 38 and cap 45 prior to heading of the rivet 24. In riveting, all of the parts are squeezed together and the retainer and spring will assume the position of FIG. 5 where the spring is substantially flattened as the cap flange 47 abuts the housing 41. The rivet is then headed at 40 to retain the parts in their assembled relation with a controlled spring pressure depending on the dimensions of the housing and cap. Thus, a 60 pound Belleville spring (in a flat position) can have a controlled spring pressure of from zero to 60 pounds utilizing this retainer.

As seen in FIGS. 2, 4 and 5, the friction washer 37 received in the recess 43 projects therebeyond to frictionally engage the surface of the plate 13, the washer being retained in the housing recess 43 by the outer diameter size. The riveting operation insures it is predetermined that all of the parts being squeezed together will actually close all of the tolerances required to initiate friction in the damper. During use of the vibration damper, as the friction material of the driven plate 13 starts to wear, the diaphragm spring 38 will continue to apply pressure as a gap begins to open up between the housing and the cap of the retainer 39 and retain the friction requirements. The diaphragm spring will continue to exert force against the housing until a complete range of movement has occurred to the point where the spring is in its unstressed conical state.

Although the present invention has been shown as a retainer for a diaphragm spring on a rivet or stop pin for a vibration damper, the spring and retainer could be used wherever there is a need to control spring pressure to a set tolerance, such as for locking bolts or other locking devices, and I do not desire to be limited in the scope of the invention by virtue of this illustrative embodiment.

I claim:

1. A retainer for a diaphragm spring to be utilized with securing means for an assembly wherein the spring pressure is accurately controlled, said retainer comprising a housing having a recess at one end to receive a diaphragm spring therein and of a depth substantially equal to the height of the unstressed diaphragm spring, and a retainer cap having a flange abutting said housing and a central projection received in said recess to engage and compress the spring to a set tolerance, the depth of said projection being slightly less than the depth of the recess so that the spring is substantially flattened when said projection is received in the housing with the flange in engagement therewith.

2. A retainer for a diaphragm spring to be utilized with securing means for an assembly wherein the spring pressure is accurately controlled, said retainer comprising a housing having a recess at one end to receive a diaphragm spring therein, the opposite end of said housing adapted to operatively engage a stationary surface, and a retainer cap abutting said housing to engage and compress the spring to a set tolerance, said securing means being a rivet having a shank extending through the surface, housing, spring and cap.

3. A spring retainer as set forth in claim 2, in which said recess has a depth substantially equal to the height of the unstressed diaphragm spring, and said cap includes a central projection adapted to be received into said recess.

4. A spring retainer as set forth in claim 3, in which the depth of the cap projection is slightly less than the depth of the recess, said projection when received in the housing engaging and substantially flattening said diaphragm spring.

5. A spring retainer as set forth in claim 3, in which the relative depth of said recess and said cap projection provides a predetermined spring pressure upon assembly of said cap and housing.

6. A spring retainer as set forth in claim 5, in which said rivet retains said housing and cap in abutting relation.

7. A spring retainer as set forth in claim 6, in which wear in said assembly allows said cap and housing to move apart with the retention of the spring pressure.

8. A spring retainer as set forth in claim 2, in which said housing includes a second recess at the opposite end thereof; and a friction washer received in said second recess, but projecting therefrom sufficiently to engage said stationary surface.

9. A spring retainer as set forth in claim 2, in which heading of the rivet compresses the cap and spring into the housing to provide a preset diaphragm spring.

* * * * *